(12) United States Patent
Kim

(10) Patent No.: US 6,642,978 B2
(45) Date of Patent: Nov. 4, 2003

(54) LIQUID CRYSTAL DISPLAY PANEL AND METHOD OF FABRICATING THE SAME

(75) Inventor: Jong-Sung Kim, Edmonton (CA)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/773,265

(22) Filed: Feb. 1, 2001

(65) Prior Publication Data
US 2002/0018160 A1 Feb. 14, 2002

(30) Foreign Application Priority Data
Feb. 2, 2000 (KR) .......................................... 2000-5074

(51) Int. Cl.⁷ ...................... G02F 1/1335; G02F 1/1333
(52) U.S. Cl. ......................... 349/110; 349/111; 349/113
(58) Field of Search ................................. 349/110, 111, 349/113

(56) References Cited

U.S. PATENT DOCUMENTS 5,815,223 A * 9/1998 Wantanbe et al. ............ 349/42
6,057,896 A * 5/2000 Rho et al. ..................... 349/42
6,122,025 A * 9/2000 Kim ........................... 349/110
6,128,060 A * 10/2000 Shimada et al. ............ 349/138
6,356,335 B1 * 3/2002 Kim et al. ................... 349/156

FOREIGN PATENT DOCUMENTS

JP 357173805 A * 10/1982

* cited by examiner

Primary Examiner—Robert H. Kim
Assistant Examiner—Hoan Nguyen
(74) Attorney, Agent, or Firm—Morgan Lewis & Bockius LLP

(57) ABSTRACT

The present invention discloses a liquid crystal display (LCD) device and a method of fabricating the same that can be used in a large size with a TN or an AFLC. More specifically, a liquid crystal display includes first and second substrates, a light-transmitting portion in the first and second substrates, wherein the light-transmitting portion has a first cell gap, a light-shielding portion in the first and second substrates, wherein the light-shielding portion has a second cell gap, wherein the second cell gap is larger than the first cell gap, and a liquid crystal layer between the first and second substrates.

21 Claims, 4 Drawing Sheets light-transmitting portion | light-shielding portion | light-transmitting portion

LIQUID CRYSTAL DISPLAY PANEL AND METHOD OF FABRICATING THE SAME

This application claims the benefit of Korean Patent Application No. 2000-5074 filed on Feb. 2, 2000, which is hereby incorporated by reference.

BACKGROUND OF THE INVENTION

1. Field of the Invention

The present invention relates to a liquid crystal display (LCD) panel, and more particularly, to a liquid crystal display panel and a method of fabricating the same. Although the present invention is suitable for a wide scope of applications, it is particularly suitable for reducing an injection time in injecting a liquid crystal into the liquid crystal display panel.

2. Discussion of the Related Art

A typical liquid crystal display (LCD) panel has upper and lower substrates and an interposed liquid crystal layer. The upper substrate usually includes common electrodes while the lower substrate includes pixel electrodes and switching elements, such as thin film transistors (TFTs). Since the present invention relates to manufacturing a liquid crystal display device, a brief description regarding the conventional liquid crystal display manufacturing processes will be helpful to fully understand the present invention. Common electrodes and pixel electrodes are formed on upper and lower substrates, respectively. A seal is then formed on the lower substrate. The upper and lower substrates are then bonded together using a sealing material such that the common electrodes of the upper substrate and the pixel electrodes of the lower substrate face against each other. Thus, a liquid crystal cell is formed therein. A liquid crystal material is then injected into the cell through injection holes. The injection holes are then sealed. Finally, polarizing films are attached to the outer surfaces of the upper and lower substrates.

In operation, the light passing through the liquid crystal cells is controlled by electric fields that are applied through the pixel and common electrodes. By controlling the electric fields, desired characters or images can be displayed on the panel.

While fabricating various components for a liquid crystal display, such as thin film transistors or color filters, typically require numerous manufacturing steps, the overall fabrication process is relatively straightforward. FIG. 1 illustrates a typical liquid crystal cell manufacturing process. In the initial step (st1), an array of thin film transistors and pixel electrodes are formed over an array or TFT substrate (rear substrate).

The next step (st2) forms an orientation film over the lower substrate. This includes the processes of depositing a polymer thin film over the lower substrate and then uniformly rubbing the polymer thin film with a fabric. The rubbing process involves rubbing the surface of the polymer thin film so as to orient or align the film. A typical orientation film is an organic thin film such as a polyimide thin film.

The third step (st3) produces a seal pattern on the lower substrate. When the upper and lower substrates are attached, the seal patterns form a cell gap that will receive a liquid crystal material. The seal pattern will also prevents the interposed liquid crystal material from leaking out of the completed liquid crystal cell. A thermosetting resin and a screen-print technology are conventionally used to form the seal pattern.

In the fourth step (st4), spacers are sprayed over the lower substrate. The spacers have a predetermined size and act to maintain a precise and uniform space between the upper and lower substrates. Accordingly, the spacers are placed with a uniform density on the lower substrate using either a wet spray method or a dry spray method. In the wet spray method, the spacers are mixed in an alcohol and sprayed on the substrates. The dry spray method includes only the step of spraying a spacer. The dry spray method is further classified into a static electric spray method using static electricity and a non-electric spray method utilizing a gas pressure. Since a static electricity can be harmful to the liquid crystal, the non-electric spray method is more widely used in fabricating the LCD panel.

The next step (st5) aligns and attaches the color filter substrate (or upper substrate) and the TFT substrate (or lower substrate) together. An aligning margin should be less than a few micrometers. If the upper and lower substrates are aligned and attached with a margin greater than the aligning margin, a display quality is deteriorated by light leakage during the operation of the liquid crystal display panel.

In the sixth step (st6), the liquid crystal cells fabricated in the previous five steps are cut into an individual liquid crystal cell. Conventionally, a liquid crystal material was injected into the space between the upper and lower substrates before the substrates were cut into the individual liquid crystal cell. As a display size becomes larger, a liquid crystal material is infected into the cell after the liquid crystal display panel is cut into a unit cell. The processes of cutting the cells typically includes the step of scribing using a diamond pen to form cutting lines on the substrate, and the step of breaking separates the substrate along the scribed lines.

In the seventh step (st7), a liquid crystal material is infected into the individual liquid crystal cells. Since each individual liquid crystal cell occupies hundred square centimeters in area while it has only a few micrometer gap between the substrates, a vacuum injection method is effectively and widely used in injecting a liquid crystal. Generally, injecting a liquid crystal material into the cells takes the longest manufacturing time in the fabrication process. Thus, for manufacturing efficiency, it is important to have optimum conditions for a vacuum injection.

FIG. 2 shows a conventional vacuum injection process for injecting a liquid crystal material into the liquid crystal cell. To inject the liquid crystal material, a liquid crystal cell 2 having an injection hole 4 is placed inside a vacuum apparatus 6. The liquid crystal cell is located over a vessel 8 that contains the liquid crystal material 10. During operation, a suction process removes air from the vacuum apparatus 6 to create a vacuum condition.

In practice, it is possible to add small air bubbles in the liquid crystal material 10 to form larger air bubbles. However, such air bubbles can cause problems. Accordingly, before injection, the liquid crystal material 10 should be left under a vacuum condition of a few mTorr for a sufficient time so that the air bubbles in the liquid crystal material 10 are removed. Conventionally, the vessel 8 containing the liquid crystal material 10 and the liquid crystal cell 2 are left under this vacuum condition.

One method of injecting the liquid crystal material into the liquid crystal cell is to dip the liquid crystal cell into the tray containing the liquid crystal material. However, the dipping method consumes too much of the liquid crystal material. Another method includes touching (i.e., slightly dipping) only the injection hole 4 to the liquid crystal material. The touching method as shown in FIG. 2, after the air in the liquid crystal cell 2 and the liquid crystal material 10 is removed, the injection hole 4 is slightly dipped into the vessel 8 containing the liquid crystal material 10. At first, the liquid crystal material 10 is injected into the liquid crystal cell 2 by capillary forces. Thereafter, a nitrogen gas is introduced into the vacuum apparatus 6. A difference in pressure between the interior and exterior of the liquid crystal cell 2 forces liquid crystal material 10 into the liquid crystal cell 2.

FIG. 3 is a graph illustrating the pressure in the vacuum apparatus 6 with respect to time. During the period "A", a vacuum condition is generated. At the end of the period "A" the injection hole 4 is dipped into the vessel 8 containing the liquid crystal material 10. During the period "B", the liquid crystal material 10 is injected into the liquid crystal cell by a pressure difference. After the injection of the liquid crystal material is complete, the injection hole 4 is sealed with an epoxy-based sealant that is applied through a dispenser.

The liquid crystal used in the fabrication of the above-mentioned LC cell is usually a twisted nematic (TN) liquid crystal because the TN liquid crystal is easily controllable and provides a good picture quality. However, since the TN liquid crystal has a long response time, a moving image cannot be readily displayed. Moreover, a residual image may be formed in large LCD devices, such as greater than 20 inches. As a result, a picture quality decreases. Thus, there is a trend to replace the TN liquid crystal with other types of liquid crystal in the large LCD device for a better displaying image.

Meanwhile, a ferroelectric liquid crystal (FLC) and an anti-ferroelectric liquid crystal (AFLC) have lately drawn an attention as a substitute for the TN liquid crystal because the FLC and the AFLC have a large spontaneous polarization characteristic. Also, the AFLC is bistable. When the AFLC is used for an LCD device, a contrast is not deteriorated with an increase in the number of pixel. In addition, a flicker is suppressed. The AFLC has a response time a hundred times faster than the TN liquid crystal and a super twisted nematic (STN) liquid crystal. This is because the AFLC has a spontaneous polarization characteristic that leads to a high-speed response, thereby improving moving images in displaying. In other words, a short response time prevents a residual image, and improves a mouse control of the computer, MS window program control, and moving images in displaying. Moreover, the AFLC molecules have an advantage of a wide viewing angle in the large LCD device due to its spatial re-arrangement with respect to the applied voltage.

However, a cell gap between the upper and lower substrates should be maintained by the distance of less than 2 $\mu$m in order to apply the AFLC to the LCD device in realizing the bistability. However, it is well known that a liquid crystal cell is impossible to have a uniform cell gap of less 2 $\mu$m.

FIG. 4 is a schematic cross-sectional view of a typical LCD panel. As shown in the drawing, a LCD cell includes a lower and upper substrates 1 and 11, and an interposed liquid crystal material 10. A pixel electrode 3 is formed on the lower substrate 1 and a common electrode 12 is formed on the upper substrate 11. The lower substrate 1 and the upper substrate 11 are spaced apart by the distance "d" of about 4 to 5 $\mu$m (i.e. a cell gap)

In the conventional method of injecting the liquid crystal material, as described above, the vacuum infection method is employed after attaching and aligning the array substrate (lower substrate) 1 and the color filter substrate (upper substrate) 11. However, it takes too much time to inject the liquid crystal material into the LCD cell larger than 20 inches. On the other hand, an LCD cell less than 20 inches can be injected with the liquid crystal material in a short period of the time.

Meanwhile, the large LCD panel needs a fast response time in order to improve a display quality for moving images and to decrease a residual image. Therefore, the AFLC is used for the large LCD device and a liquid crystal is injected into the cell gap of less than 2 $\mu$m to achieve the fast response time. However, it takes too much time to inject the AFLC uniformly into this cell gap. Moreover, since a viscosity coefficient of the AFLC is ten times higher than that of the TN liquid crystal, an injection time becomes longer. For example, coefficient of the TN liquid crystal is 20 mm$^2$/sec.

SUMMARY OF THE INVENTION

Accordingly, the present invention is directed to a liquid crystal display panel that substantially obviates one or more of the problems due to limitations and disadvantages of the related art.

An object of the present invention is to decrease an injection time of the liquid crystal and to increase yield of the liquid crystal display panel.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

The present invention provides a liquid crystal device, which includes a liquid crystal display includes first and second substrates, a light-transmitting portion in the first and second substrates, wherein the light-transmitting portion has a first cell gap, a light-shielding portion in the first and second substrates, wherein the light-shielding portion has a second cell gap, wherein the second cell gap is larger than the first cell gap, and a liquid crystal layer between the first and second substrates.

In another aspect the present invention, a liquid crystal display includes first and second substrates positioned to have a first cell cap, a first hole in close proximity of the first substrate, a second hole in close proximity of the second substrate, wherein the first and second holes broaden the first cell gap, thereby forming a second cell gap; and a liquid crystal layer between the first and second substrates.

A further aspect of the present invention, a method of fabricating of a liquid crystal display having first and second substrates, the method includes the steps of forming a light-transmitting portion in the first and second substrates, wherein the light-transmitting portion has a first cell gap, forming a light-shielding portion in the first and second substrates, wherein the light-shielding portion has a second cell gap larger than the first cell gap, and forming a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate an embodiment of the invention and together with the description serve to illustrate the principles of the invention.

In the drawings.

DETAILED DESCRIPTION OF THE PREFERRED EMBODIMENTS

Reference will now be made in detail to the preferred embodiments of the present invention, examples of which is illustrated in the accompanying drawings.

Figure 1:
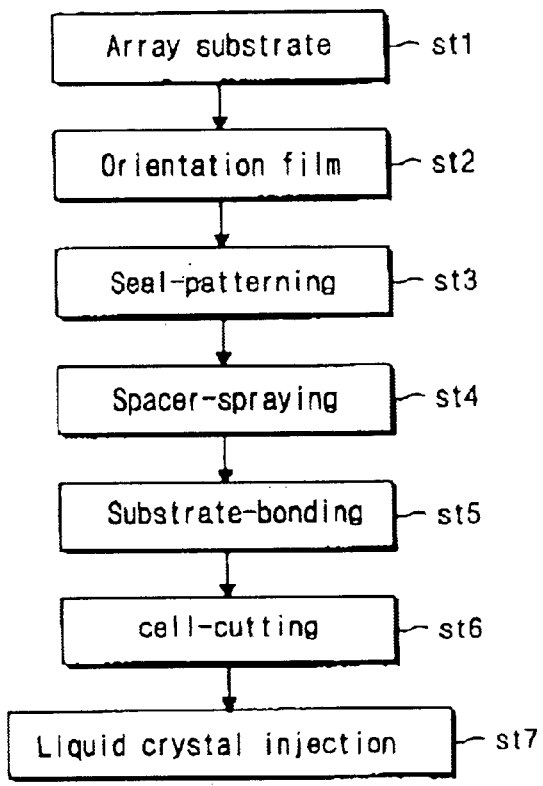
FIG. 1 is a flow chart illustrating a typical manufacturing process for a liquid crystal cell.
Figure 2:
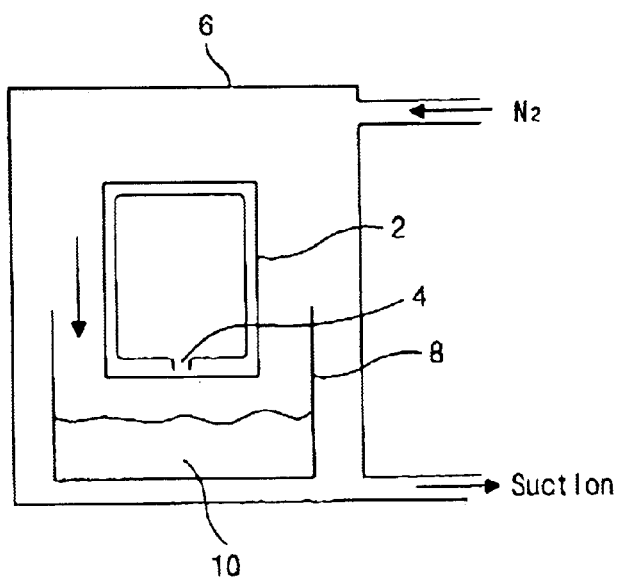
FIG. 2 illustrates a typical vacuum injection apparatus.
Figure 3:
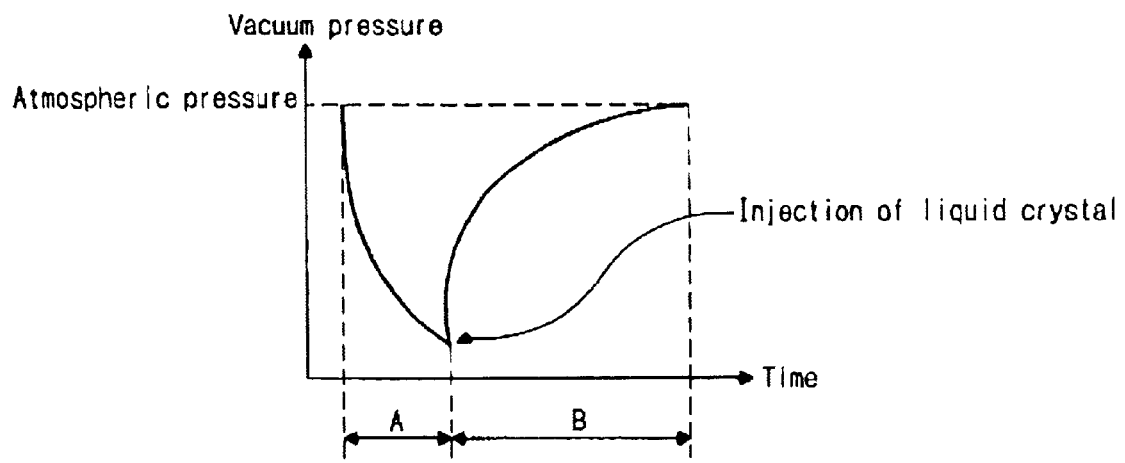
FIG. 3 is a graph of the vacuum pressure versus an injection time when a liquid crystal material is injected into the liquid crystal cell.
Figure 4:
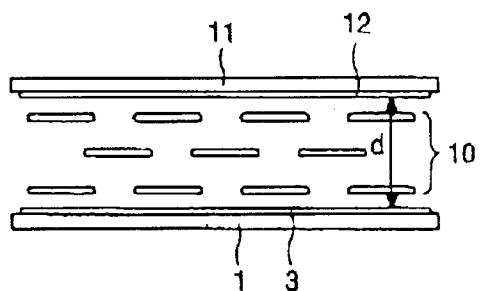
FIG. 4 is a schematic cross-sectional view of a typical liquid crystal display cell.
Figure 5:
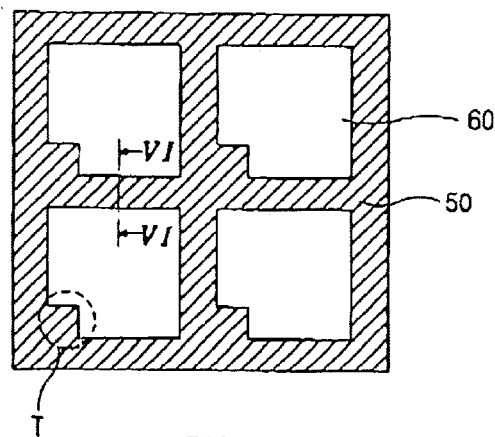
FIG. 5 is a plan view of a liquid crystal display device according to the present invention.

Initially referring to FIG. 5, a liquid crystal display is divided into light transmitting portions 60 and a light-shielding portion 50. Thin film transistors (TFTs) "T" are formed in the light-shielding portion 50 at one of the corners of the light-transmitting portions 60. The TFTs "T" include gate, source and drain electrodes (not shown). The light-transmitting portions 60 are areas displaying an image, and each light-transmitting portion 60 includes a pixel electrode and a color filter (not shown). The light-transmitting portion 50 includes gate and data lines (not shown) and a black matrix (not shown) that prevents a cross talk. The cross talk is created by the gate and data lines, thereby deteriorating a quality of the images.

Accordingly, the light-transmitting portion 60 substantially affects the image of the LCD device. Thus, a cell gap of the light-transmitting portion 60 should be maintained uniformly. In other words, a cell gap of the light-shielding portion 50 does not have to be uniform because the displaying image is not varied with the light-shielding portion 50. Therefore, the present invention relates to an LCD device that has a difference in the cell gap of the light-transmitting portion 60 and the light-shielding portion 50. In contrary, an LCD device in the conventional art has the uniform cell gap.

Figure 6:
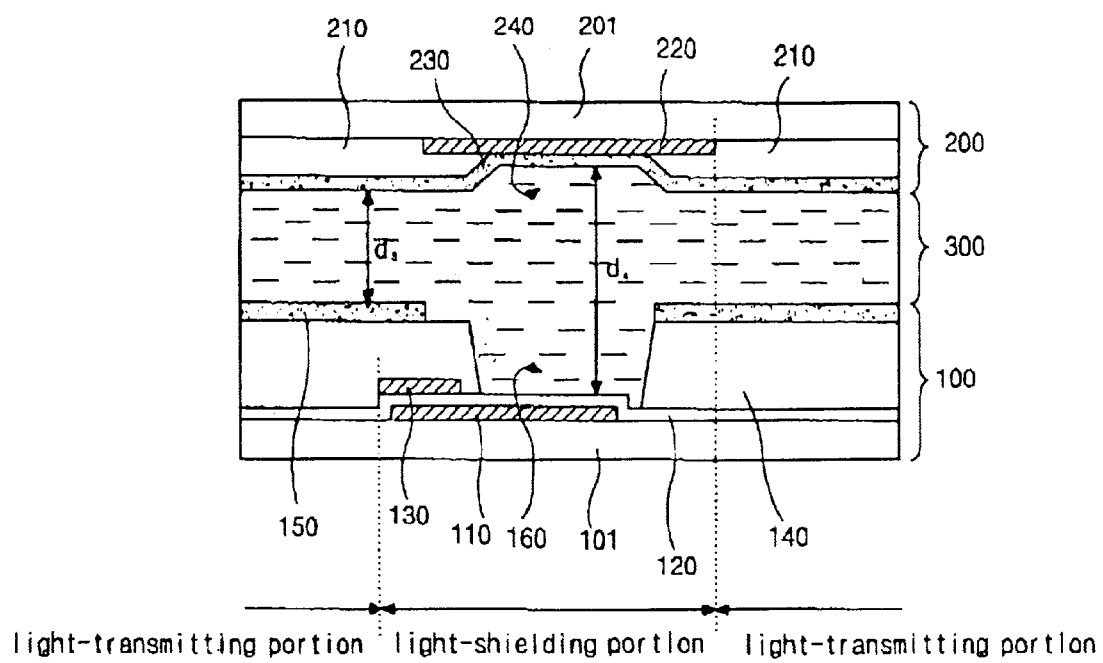
FIG. 6 is a cross-sectional view taken along the line VI—VI in FIG. 5.

FIG. 6 is a cross-sectional view taken with the line VI—VI in FIG. 5 and illustrates a configuration of the LCD device. As shown in the drawing, an LCD device includes a lower substrate 100 (referred to as an array substrate) and an upper substrate 200 (referred to as a color filter substrate) which face into and space apart from each other. The LCD device also includes a liquid crystal layer 300 that is interposed between the lower substrate 100 and the upper substrate 200.

Now referring to the array substrate 100, a gate line 110 is formed on a first transparent substrate 101, and a gate insulation layer 120 is formed on the first transparent substrate 101 including the gate line 110. A capacitor electrode 130 is formed on the portion of the gate insulation layer 120 including the gate line 110. A protection layer 140 formed of BCB (benzocyclobutene) or acryl is formed on the capacitor electrode 130 and the gate insulation layer 120. A protection layer 140 has a first hole 160 over the gate line 110, exposing a portion of the gate insulation layer 120. A pixel electrode 150 formed of a transparent conductive material is formed on the protection layer 140.

Referring to the color filter substrate 200 of FIG. 6, a black matrix 220 is formed on the surface of a second transparent substrate 201 facing into the array substrate 100. Color filters 210 are formed on the second transparent substrate 201 and overlap the peripheral portion of the black matrix 220. A common electrode 230 is formed on the color filter 210 and contacts a portion of the black matrix 220 At this time, a second hole 240 facing into the first hole 160 is formed by the step portion of the color filter 210.

As described in FIGS. 5 and 6, the light-shielding portion 50 is formed by the gaze line 110 of the array substrate 100 and the black matrix 220 of the color filter substrate 200. In the present invention, since the first and second holes 160 and 240 are respectively formed in the array substrate 100 and the color filter substrate 200, the cell gap formed in the light-shielding portion by the first and second holes becomes larger. Namely, a first cell gap "$d_3$" between the pixel electrode 150 and common electrode 230 is narrower than a second cell gap "$d_4$" between the first and second holes 160 and 240. It is possible that the first cell gap "$d_3$" becomes less than 2 $\mu$m and the second cell gap "$d_4$" is at least 4 $\mu$m. The first and second holes 160 and 240 can be formed all together in the liquid crystal display device. Alternatively, they can be formed separately in the array or color filter substrates.

When a liquid crystal is injected into the CD device in the present invention, the injected liquid crystal flows along the second cell gap "$d_4$" due to the large space between the first and second holes 160 and 240. Thereafter, the liquid crystal flows into the first cell gap "$d_3$" (i.e., the light-transmitting portion where the image is displayed).

As mentioned above, since the LCD device in the present invention has the first and second holes in the light-shielding portion of the array and color filter substrates, the liquid crystal is easily injected into the cell gap. Moreover, although the AFLC that has a short response time and a high viscosity coefficient, it can easily be injected into the cell gap of less than 2 $\mu$m because the CD device has the holes as a means for transferring the liquid crystal.

Figure 7:
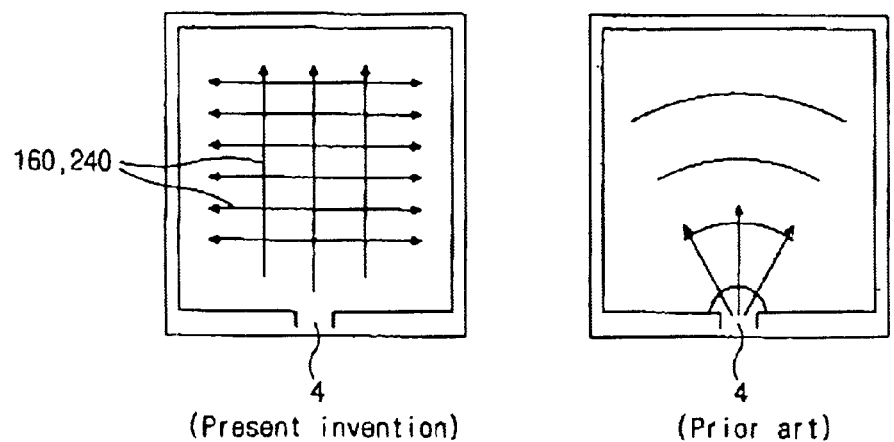
FIG. 7 is a schematic view illustrating an injection of the liquid crystal in the present invention and the prior art.

FIG 7 is a schematic view illustrating an injection of the liquid crystal in the present invention and the prior art. In the LCD device of the prior art, the liquid crystal flows and spreads out from the injection hole 4 as shown in the drawing. The liquid crystal in the LCD device of the present invention flows along the holes that are formed in the light-shielding portion of the substrates. The liquid crystal is then spread into the light-transmitting portion. Thus, the injection time of the present invention is many times shorter than that of the prior art regardless of the cell gap size. Generally, a cell gap in the present invention is equal to or narrower than that of the prior art.

Figure 8:
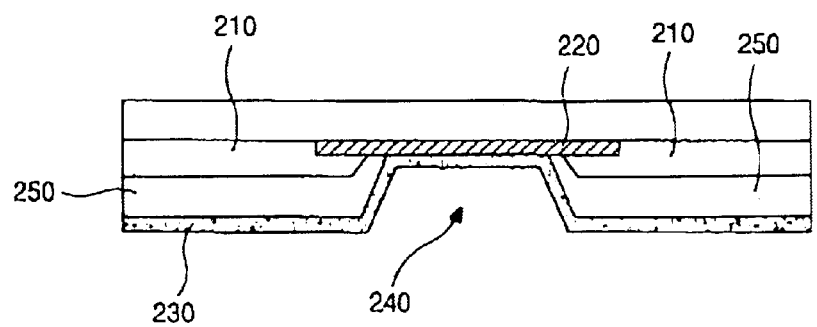
FIG. 8 is a cross-sectional view illustrating an upper substrate according to another embodiment of the present invention.

FIG. 8 is a cross-sectional view illustrating an upper substrate according to another embodiment of the present invention. As shown in FIG. 8, an organic insulation layer 250 is formed between the color filters 210 and the common electrode 230 in order to make the second hole 240 deeper.

By forming an additional layer (the organic insulation layer 250), the second cell gap "$d_4$" (shown in FIG. 6) becomes broader, thereby shortening an injection time.

Figure 9:
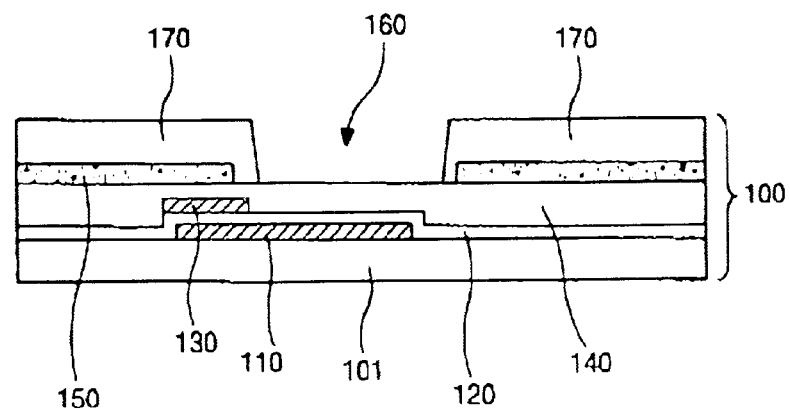
FIG. 9 is a cross-sectional view illustrating a lower substrate according to another embodiment of the present invention.

FIG. 9 is a cross-sectional view illustrating an array substrate according to another embodiment of the present invention. As shown, an additional protection layer 170 is formed on the protection layer 140 and the pixel electrode 150 The first hole 160 is then formed by patterning the additional protection layer 170. Thus, an injection time is shortened in this way.

As mentioned above, the LCD device according to the present invention has holes in the light-shielding portion defined by the black matrix, the gate, and the data lines, an infection time is decreased. Thus, a liquid crystal is injected in a short period of time into a large LCD device having a minute cell gap.

Moreover, an AFLC having a large viscosity coefficient and a short response time is injected into the minute cell gap. As a result, the LCD device of the present invention displays moving images very well and decreases residual images due to the short response time.

It will be apparent to those skilled in the art that various modifications and variation can be made in the present invention without departing from the spirit or scope of the invention. Thus, it is intended that the present invention covers the modifications and variations of this invention provided they come within the scope of the appended claims and their equivalents.

What is claimed is:

1. A liquid crystal display comprising:
    a first substrate having a first protective layer and a pixel electrode;
    a second substrate having a common electrode;
    a light-transmitting portion in the first and second substrates, wherein the light-transmitting portion has a first cell gap between the pixel electrode and the common electrode;
    a light-shielding portion in the first and second substrates, wherein the light-shielding portion has a second cell gap between a recessed portion of the common electrode and a recessed portion of the first protective layer exposing a portion of a gate insulating layer, wherein the second cell gap is larger than the first cell gap;
    a black matrix on the second substrate;
    a color filter layer on the black matrix; and
    a liquid crystal layer between the first and second substrates.

2. The device of claim 1, wherein the light-shielding portion has a thin film transistor, a gate and data lines.

3. The device of claim 2, wherein the first protective layer is on the gate lines, the first protective layer having a first hole so as to form the recessed portion of the first protective layer.

4. The device of claim 3, wherein the first protective layer is formed of BCB (benzocyclobutene) or acryl.

5. The device of claim 1, further comprising a second protective layer on the pixel electrode, the second protective layer having a first hole so as to form the recessed portion.

6. The device of claim 1, wherein the color filter layer has a second hole so as to form the recessed portion of the common electrode.

7. The device of claim 6, wherein the second hole forms a portion of the second cell gap.

8. The device of claim 1, further comprising an insulation layer on the color filter layer.

9. The device of claim 8, wherein the insulation layer has a second hole so as to form the recessed portion of the common electrode.

10. A liquid crystal display comprising:
    a first substrate having gate and data lines and a protection layer and a second substrate, the first and second substrates defining a first cell gap therebetween;
    a first hole in the protection layer of the first substrate, the first hole corresponding to the gate and data lines and exposing a portion of a gate insulating layer;
    a second hole in the second substrate, wherein the first and second holes broaden the first cell gap to form a second cell gap;
    a black matrix on the second substrate;
    a color filter layer on the black matrix; and
    a liquid crystal layer between the first and second substrates.

11. The device of claim 10, wherein the second hole is formed in the color filter layer and corresponds to the black matrix.

12. The device of claim 10, wherein the second cell gap is larger than the first cell gap.

13. A method of fabricating a liquid crystal display having first and second substrates, the method comprising the steps of:
    forming a first protective layer and a pixel electrode on the first substrate;
    forming a common electrode on the second substrate;
    forming a light-transmitting portion in the first and second substrates, wherein the light-transmitting portion has a first cell gap between the pixel electrode and the common electrode;
    forming a light-shielding portion in the first and second substrates, wherein the light-shielding portion has a second cell gap between a recessed portion of the common electrode and a recessed portion of the first protective layer to expose a portion of a gate insulating layer, wherein the second cell gap is larger than the first cell gap;
    forming a black matrix on the second substrate;
    forming a color filter layer on the black matrix; and
    forming a liquid crystal layer between the first and second substrates.

14. The method of claim 13, wherein the light-shielding portion has a thin film transistor and gate and data lines thereon.

15. The method of claim 14, wherein the first protective layer is formed over the gate lines, the first protective layer having a first hole so as to form the recessed portion of the first protective layer.

16. The device of claim 15, wherein the first protective layer is formed of BCB (benzocyclobutene) or acryl.

17. The method of claim 13, further comprising the steps of forming a second protective layer on the pixel electrode, the second protective layer having a first hole so as to form the recessed portion.

18. The method of claim 13, wherein the color filter layer has a second hole so as to form the recessed portion of the common electrode.

19. The method of claim 18, wherein the second hole forms a portion of the second cell gap.

20. The method of claim 13, further comprising the step of forming an insulation layer on the color filter layer.

21. The method of claim 20, wherein the insulation layer has a second hole so as to form the recessed portion of the common electrode.

* * * * *